United States Patent [19]

Kemp

[11] 3,760,369

[45] Sept. 18, 1973

[54] DISTRIBUTED MICROPROGRAM CONTROL IN AN INFORMATION HANDLING SYSTEM

[75] Inventor: John Curtis Kemp, Owego, N.Y.

[73] Assignee: International Business Machines Corporation, Armonk, N.Y.

[22] Filed: June 2, 1972

[21] Appl. No.: 259,264

[52] U.S. Cl. .......... 340/172.5

[51] Int. Cl. .......... G06f 9/12

[58] Field of Search .......... 340/172.5

[56] References Cited

UNITED STATES PATENTS

| | | | |
|---|---|---|---|
| 3,699,526 | 10/1972 | Iskiyan et al. | 340/172.5 |
| 3,440,612 | 4/1969 | Womack | 340/172.5 |
| 3,634,883 | 1/1972 | Kreidermacher | 340/172.5 |
| 3,325,785 | 6/1967 | Stevens | 340/172.5 |
| 3,380,025 | 4/1968 | Ragland | 340/172.5 |
| 3,319,394 | 7/1968 | Ottaway et al. | 340/172.5 |
| 3,570,006 | 3/1971 | Hoff et al. | 340/172.5 |
| 3,646,522 | 2/1972 | Furman et al. | 340/172.5 |

*Primary Examiner*—Paul J. Henon
*Assistant Examiner*—Melvin B. Chapnick
*Attorney*—G. E. Clark et al.

[57] ABSTRACT

In an information handling system, microprogram control is achieved through a number of distributed microprogram storage elements operating under the control of a sequence generator in response to portions of an instruction or external signals. Each of the microprogram storage elements generates microorders for a portion of the operation of an information handling system such as instruction fetch sequence, address generation, operand fetch and instruction execution. Conditions occurring during the execution of instructions may cause a modification in the microorders generated for controlling instruction execution.

6 Claims, 8 Drawing Figures

FIG. 1
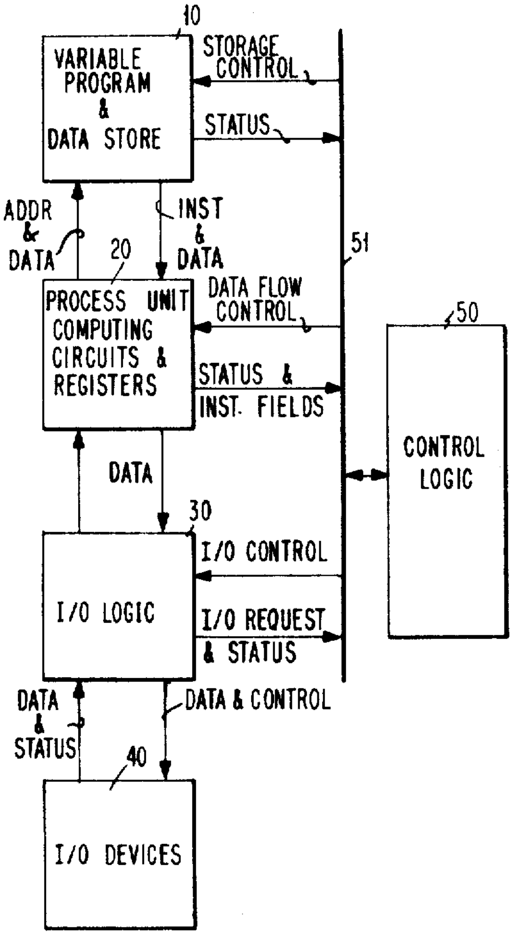
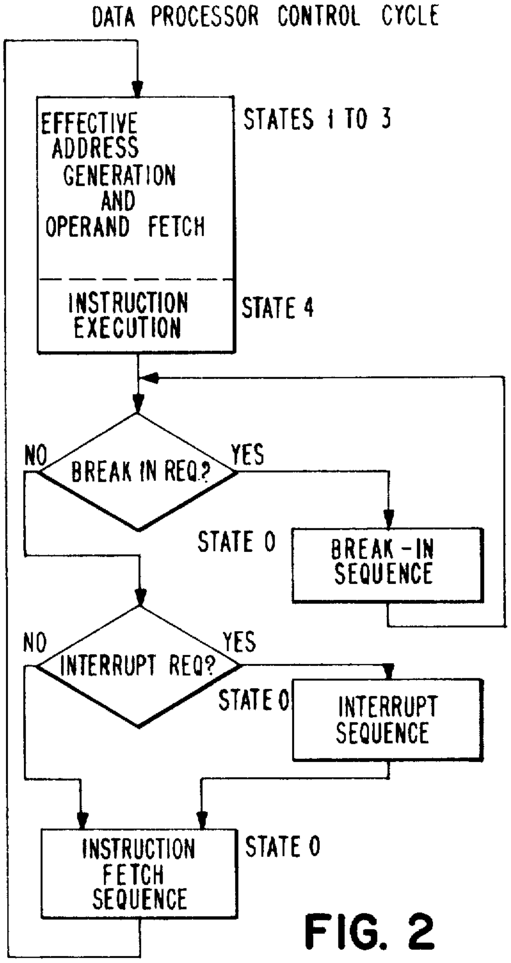
FIG. 2
FIG. 4 -PRIORITY ENCODER FUNCTION
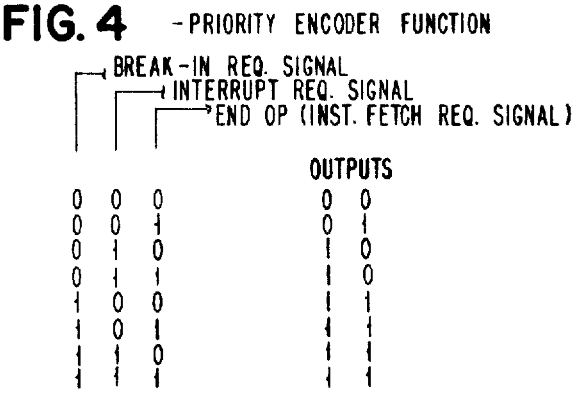
FIG. 7A
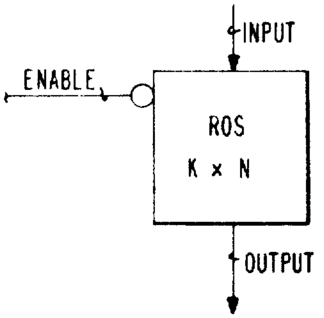

DISTRIBUTED MICROPROGRAM CONTROL IN AN INFORMATION HANDLING SYSTEM

BACKGROUND OF THE INVENTION

The present invention relates to information handling systems and more particularly to microprogram control of information handling systems.

In the prior art, it is well known that sequencing controls which have improved uniformity of design, increased efficiency and improved simplicity and flexibility, can be produced by the use of microprogramming techniques. A list of major order codes, or macroinstructions which represent gross functions to be performed by an information handling system are translated into a series of microoperations, or elemental system states. Each microoperation is controlled by a corresponding microinstruction word contained in a control storage of permanent of semi-permanent nature. Basic accessing controls for implementing the microprogram sequences are sequentially responsive to signals derived from outputs from control storage and to branch control signals derived from sources external to the controls.

To the extent that access to the control storage is controlled by the current microinstruction output of that storage, the selection of the next microinstruction may be said to be predetermined. Thus the size or range of the group of control storage addresses from which the next address will be selected, is determined only by the ranges of the independently varying branch control signals. Normally, the maximum number of branch choices, is fixed by selecting a predetermined number of branch control signals from a larger field of variable signals in accordance with conditions to be met by the microprogram.

Microprogram controls, therefore, usually contain two distinct functional areas. The first is that portion of the control storage which produces control signals or microoperations which control the circulation of information throughout the controlled system on a cyclic basis. The second is the access controls which produce the address signals for controlling the sequence of microinstructions produced by the first set of controls. The portion of control storage which provides next address information is part of the access control function.

In the past, the state of component and circuit development was such that it was advantageous to minimize control storage support electronics by providing a single storage element with as small a capacity as was consistent with the requirements of the information handling system. This single minimal control storage resulted in a complicated access control due to the large number of branch control signals required to define all phases of operation.

SUMMARY OF THE INVENTION

Therefore, it is an object of the present invention to efficiently implement distributed microprogram controls.

It is another object of the present invention to implement access controls in a plurality of independent control storage elements.

A further object of the present invention is to exercise sequence control over a group of control storage elements to achieve microprogram control for an information handling system.

A still further object of the present invention is to partition a microprogram control system into portions which are readily implemented in monolithic solid state technologies.

Accordingly, the present invention provides means of implementing microprogram controls which distribute the control function over several control storage elements. A first control storage element controls the instruction fetch sequence, the break-in sequence and interruption sequences. A group of second control storage elements controls address generation and operand fetch operations.

Another control storage element controls instruction execution operations of an information handling system in a predetermined sequence with the option of branching to a different sequence of microorders in response to conditions occurring in a data flow during the instruction execution.

The operation of each of the control storage elements discussed above is controlled by a sequence generator which establishes a sequence of operation in response to a portion of the instruction to be executed. The microprogram control does not require than each operational state be entered in every control cycle. One or more of the control storage elements may be skipped over if the function performed by that control storage element is not required.

The foregoing and other objects, features and advantages of the invention will be apparent from the following more particular description of a preferred embodiment of the invention, as illustrated in the accompanying drawing.

BRIEF DESCRIPTION OF THE DRAWING

FIG. 1 is a block diagram of an nformation handling system showing the relationship of microprogram controls to other components of the system.

FIG. 2 is a flow diagram of the sequence of control operations required for an information handling system.

FIG. 4 shows the bit patterns produced by a priority encoder shown in FIG. 3.

FIG. 7A shows a control storage element such as may be used in the embodiment shown in FIG. 3.

DETAILED DESCRIPTION

Figure 3:
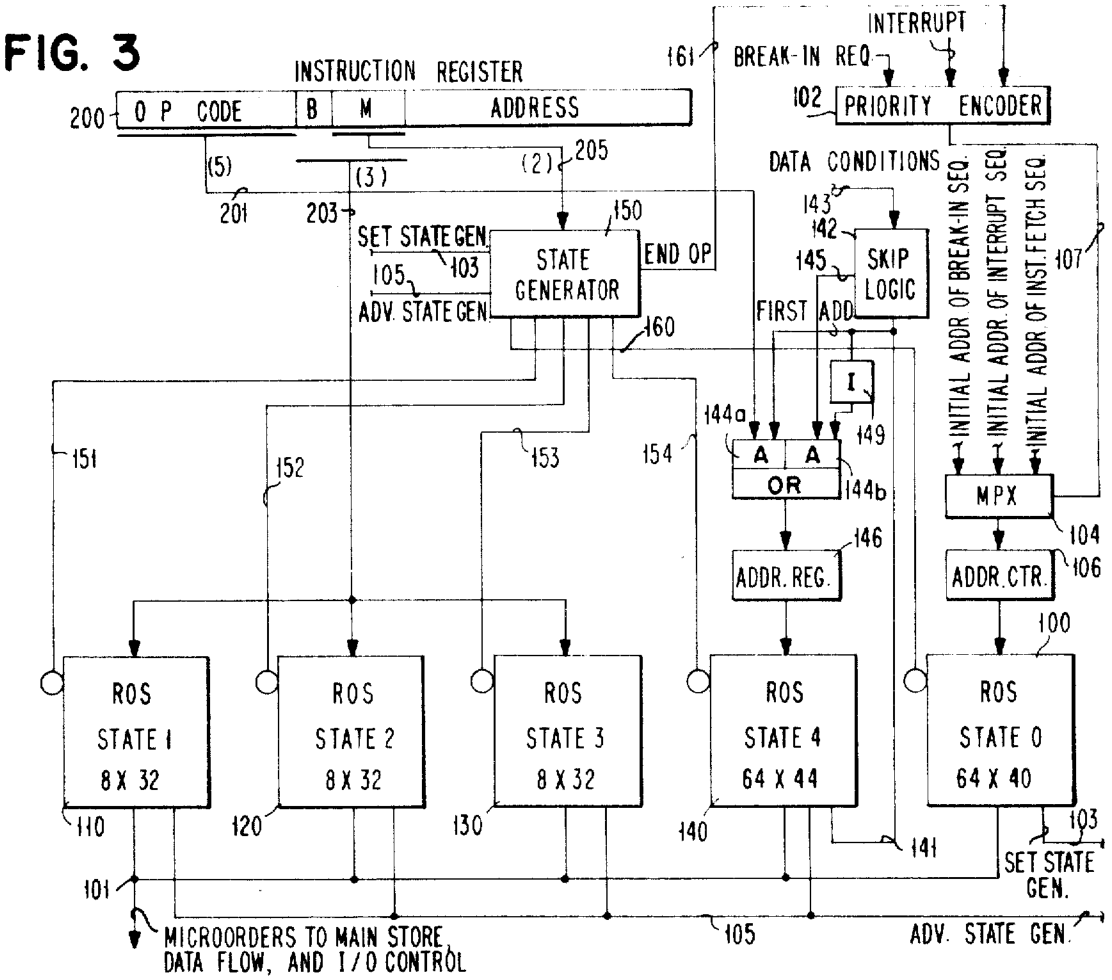
FIG. 3 is a block diagram of a microprogram control subsystem according to the present invention.

Referring now to FIG. 1, a generalized block diagram of an information handling system is shown in which a program and data storage 10 can communicate with a processing unit 20 including computing circuits and registers and with a control bus 51. Storage 10 receives control signals from control logic 50 via control bus 51 and returns status information to the control logic 50. Instructions, address and data information is communicated between the processing unit 20 and storage 10.

Control logic 50 transmits data flow control signals to processing unit 20 and receives status and instruction information.

Processing unit 20 transfers data to I/O logic 30 which also receives control signals from control logic 50 and transmits request and status signals to control logic 50 via control bus 51. I/O logic 30 communicates data and control signals to I/O devices 40 and receives data nad status signals in response.

The block diagram of FIG. 1 is a well known implementation of an information handling system wherein control logic 50 operates to effectively control information processing throughout the data flow.

Referring now to FIG. 2, a typical control cycle is shown in which operation is initiated by detecting whether there is a break-in or interrupt request outstanding or whether an instruction fetch sequence is to be executed. The break-in request, interrupt request and instruction fetch sequences are operated under the control of a microprogram storage element defined as state 0 control.

The instruction fetch sequence is always followed by address generation, data operand fetch (states 1, 2 &3) and instruction execution sequences (state 4). References to control states 0, 1, 2, 3 and 4 will be described in more detail.

All of the operations shown in FIG. 2, are performed by control logic 50 shown in FIG. 1 which is shown in greater detail in FIG. 3. At the end of each instruction execution cycle of the information handling system, state generator 150 which controls the sequence of operations of the control logic is set to state 0, enabling state 0 microprogram control element 100. During state 0 operation, microprogram control element 100 controls the information handling system. Priority encoder 102 generates a select signal for multiplexor 104 which causes a predetermined initial address to be gated to address counter 106.

Priority encoder 102 generates select and enable signals according to the table shown in FIG. 4. For example, if an end operation or instruction fetch request signal is generated by state generator 150, the select line inputs to multiplexor 104 exhibit a bit pattern of 01 and the enable line is active. This select line bit pattern results in the initial address of the instruction fetch sequence to be gated by multiplexor 104 to address counter 106.

If an interrupt request signal were presented, the select line bit pattern would be 10 with the enable line active thus causing multiplexor 104 to gate the initial address of the interrupt sequence to address counter 106. If the break-in request signal is active, priority encoder 102 generates a select line bit pattern of 11 on line 107 with an active enable line thus causing multiplexor 104 to gate the initial address of the break-in sequence to address counter 106.

It should be noted, that the priority of handling the request signals is established by priority encoder 102 as follows:

Whenever the break-in request signal is present it takes first priority over all other requests and a select line bit pattern of 11 is generated;

when the interrupt request signal is present, it takes priority over the end op or instruction fetch request signal and the select line bit pattern of 10 is generated. The end op instruction fetch request signal has the lowest priority and is only handled when no higher priority signal is present.

Multiplexor 104 may be implemented by any of several commerically available four line to one line multiplexors where in the present embodiment only three sets of input lines are being used.

The end operation signal on line 161 is generated during the last cycle of instruction execution which is under the control of the state 4 control storage element 140. The end operation signal acts as a request for an instruc-tion fetch.

Figure 5:
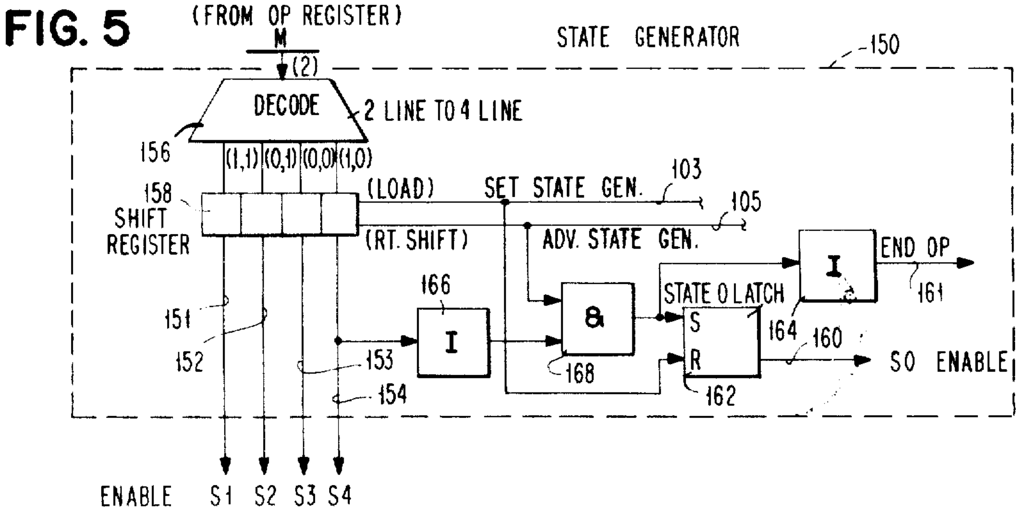
FIG. 5 shows an implementation of a sequence generator for a microprogram control subsystem according to the present invention.

Referring now to FIG. 5, the end op signal on line 161 is generated by NAND gate 168 when an advance state generator signal on line 106 occurs during state 4. Inverter 166 is connected between line 154 and the input to AND gate 168 to provide proper polarity to enable AND gate 168 during state 4. An output from NAND gate 168 activates the end op signal on line 161 through inverter 164 and sets the state 0 latch 162 activating the state 0 enable line 160.

The state 0 microprogram control element 100 retains control of the information handling system until the required break-in, interrupt handling or instruction fetch sequences are completed. The state 0 sequences do not contain internal branches but rather are under the control of address counter 106 which may be implemented as a conventional binary counter.

The instruction fetch sequence fetches the instruction identified by the program counter (not shown) from main storage 10 shown in FIG. 1 and places it in the instruction register 200 (see FIG. 3).

When the instruction fetch sequence is completed, state 0 microprogram control element 100 generates the micro order "set state generator" on line 103. This micro order causes state generator 150 (see FIG. 3) to assume a state which is controlled by the contents of instruction register 200 field M presented to state generator 150 on lines 205.

Microprogram control elements 110, 120 and 130 for states 1, 2 and 3, respectively, are activated only when the particular instruction to be executed requires microorders stored in one of these control elements to be accessed. Mircroprogram control elements 110, 120 and 130 are addressed by information contained in the "B" and "M" fields of instruction register 200 which is transmitted by lines 203 to the respective microprogram control elements. For example, an indirect addressing instruction may require the state generator to enable microprogram control element 110 to begin address generation and operand fetch in state 1.

Other instructions may require state generator 150 to begin address generation and operand fetch in either state 2 or state 3 by enabling microprogram control elements 120 or 130, respectively.

Referring again to FIG. 5, state generator 150 is shown in greater detail in which the M field from instruction register 200 presents a two bit input to a decoder 156 which generates a four line output to a shift register 158. Lines 151, 152, 153 and 154 provide enable signals to control elements 110, 120, 130 and 140 respectively. If the M field bit pattern is "11", state 1 is enabled first and the shift register 150 progressively shifts through the sequence state 1, state 2, state 3, state 4 with the "advance state generator" signal on line 105 causing a right shift operation.

If the M field bit pattern is "01", state 2 is enabled first and the sequence is shifted as before with the advance state generator signal.

A "00" M field bit pattern results in state 3 being enabled first and a "10" M field bit pattern results in state 4 being enabled.

Shift register 158 shifts to the right only and state 4 is always the last state to be entered for instruction execution. State 4 microprogram control element 140 always returns control to state 0 microprogram control element 100 through NAND gate 168 and state 0 latch 162.

The advance state generator signal is a micro order which is generated by each microprogram control element 110, 120, 130 and 140 when the respective microprogram control element has completed the part of the operation of the information handling system over which it has control.

The microprogram control elements 110, 120, and 130 for states 1, 2, and 3 control the operation of the information handling system for one cycle each and require no local address capability. Microprogram control element 140 for state 4 has a multiple cycle control capability for shift, multiply and divide type instructions. Microprogram control elements 110, 120, 130 and 140 generate micro orders for controlling the operation of an information handling system by producing micro orders on microinstruction bus 101.

The operation code (op code) on lines 201 is used as the starting address through gates 144 when the first address line is active. Gates 144*a* present the op code to address register 146 which accesses microprogram control element 140.

Microprogram control element 140 produces control signals on lines 141 which enable skip logic 142 (shown in FIG. 6) and gates 144*b* to enable alternate addresses in microprogram control element 140 to be accessed upon the occurrence of a variety of conditions occurring in the data flow during the execution of instructions.

Figure 6:
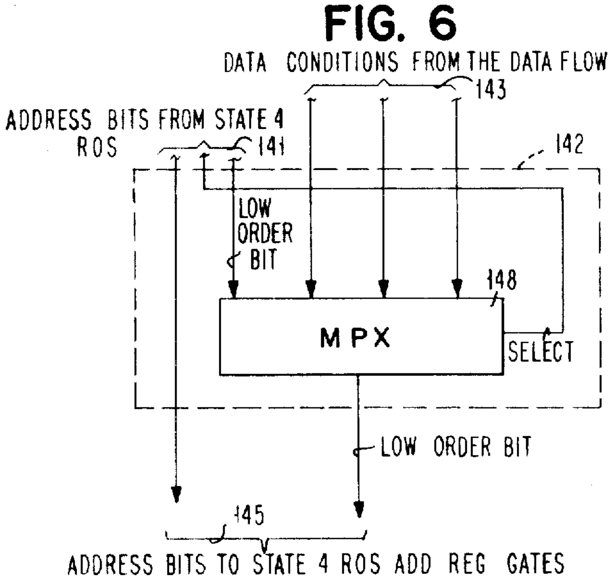
FIG. 6 shows an implementation of the skip logic for state 4 microprogram storage element shown in FIG. 3.

Skip logic 142 shown in FIG. 6, allows a variety of data conditions on lines 143 to modify the low order bit of the address for microprogram control element 140 under the control of lines 141. Multiplexor 148 may be implemented with the same commercially available unit as multiplexor 104. Skip logic 142 has an output connected to gates 144b by line 145. Low order bit control line 141 is connected to skip logic 142, AND gate 144*a* and inverter 149 to enable the op code on lines 201 to be presented to address reg 146 with line 141 in a first condition and the address modification information from skip logic 142 to be presented to address reg 146 when control line 141 is in a second condition.

Multiplexor 148 allows data conditions to switch the low order bit of the next address under the control of microprogram control element 140 thus enabling an alternative microinstruction to be executed depending upon data flow conditions.

Thus, the state 4 microprogram control element 140 controls the operation of the information handling system during instruction execution cycles in a manner responsive to conditions which may occur in the data flow requiring alternative microinstructions to be generated. After the instruction execution is completed, microprogram control element 140 generates micro order advance state generator on line 105 which causes state generator 150 to advance to state 0 and generate an end operations signal thus completing one operation cycle.

The preferred embodiment is described above with relation to an information handling system. However, the invention is not limited to such applications but may also be used to control input/output devices, character generation systems and other logic systems which require a sequence of operations to be controlled.

Each microprogram control element 100, 110, 120, 130 and 140 may be implemented as a monolithic integrated read only storage commercially available device.

Figure 7B:
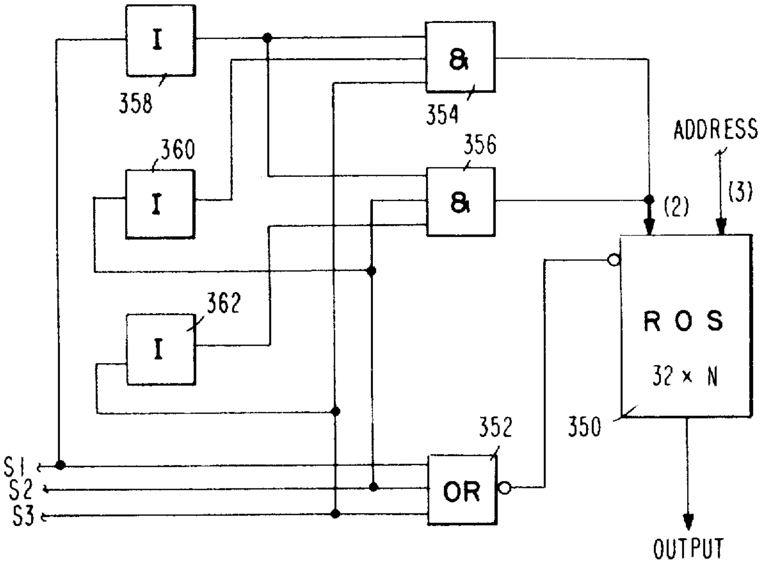
FIG. 7B shows an alternate embodiment of control storage elements for controlling state 1, state 2 and state 3 of an operational sequence of an information handling system microprogram control system as shown in FIG. 3.

FIG. 7A and FIG. 7B show two alternatives for implementation of the state 1, state 2 and state 3 microprogram control elements. FIG. 7A shows as does the preferred embodiment shown in FIG. 3, a separate read only storage element having an address input, and enable input and a microorder output wherein the microprogram control element size is specified by K × N where K represents the number of addresses in the microprogram control element and N represents the number of bits in each microorder stored in a microprogram control element.

FIG. 7B shows an alternative embodiment where a larger matrix is more advantageous. States 1, 2 and 3 are combined in a single monolithic structure where the address input now requires five bits in parallel as opposed to three bits in parallel when the state microprogram elements are separate. These five bits are 3 address bits from the "B" and "M" fields of the Instruction Register 200 and 2 additional bits generated from the state 1, state 2 and state 3 lines by gates 354 and 356 and Inverters 358, 360 and 362. The output of gate 354 is logically equal to $\overline{S1}$ & $\overline{S2}$ & S3. The output of gate 356 is logically equal to $\overline{S1}$ & S2 & $\overline{S3}$. The enable signals are combined in OR circuit 352 to enable microprogram control element 350 so that any one of 32 addresses of length N may be accessed. The structure shown in FIG. 7A and 7B may be used with the block diagram implementation shown in FIG. 3 with no change required to state generator 150.

Thus, the present invention allows a microprogram control subsystem to be constructed in an efficient and economical manner with fewer bits of storage required for a given control function than the prior art.

While the invention has been particularly shown and described with reference to the preferred embodiments thereof, it will be understood by those skilled in the art that various changes in form and detail may be made therein without departing from the spirit or scope of the invention.

What is claimed is:

1. Apparatus, for controlling the operation of an information handling system, comprising:

first means responsive to a first input signal for controlling instruction fetch operations;

second means responsive to a first field of an instruction for controlling address generation and data fetch operations;

third means responsive to a second field of said instruction for controlling the execution of operation specified by said instruction; and fourth means responsive to a third field of said instruction for controlling the sequence of operations of said first, second and third means.

2. Apparatus according to claim 1 wherein said first input signal is generated by means responsive to a priority signal for determining which of several sequences of operation shall be performed first.

3. Apparatus according to claim 1 further comprising means for selecting alternative sequences of operation of said third means in response to conditions occurring during execution of operations specified by said instruction.

4. A microprogram control subsystem, for an information handling system, said subsystems comprising:

a plurality of distributed microprogram storage elements each for controlling a portion of the operation of said information handling system at a different time;

sequence control means responsive to a field of an instruction to be executed by said information handling system for controlling the enabling of each of said microprogram storage elements in a predetermined sequence;

priority control means for controlling response to request signals by a first of said microprogram storage elements according to a predetermined priority;

gating means responsive to conditions occurring in data flow during execution of said instruction for branching to a different sequence of microinstructions in a second one of said microprogram storage elements; and means for transmitting microinstructions generated by said microprogram storage elements to main storage, data flow and input/output control elements.

5. A microprogram control subsystem, for an information handling system, said subsystem comprising:

a plurality of distributed read only storage elements, each of said read only storage elements being separately enabled, for controlling the operation of said information handling system during one of a plurality of operational states;

sequence control means responsive to a field of an instruction to be executed by said information handling system for controlling the enabling of each of said read only storage elements in a predetermined sequence;

priority control means for controlling response to request signals by a first of said read only storage elements according to a predetermined priority;

gating means responsive to conditions occurring in data flow during execution of said instruction for branching to a different sequence of microinstructions in another of said read only storage elements;

means for controlling the operation of said sequence control means in response to outputs from said plurality of read only storage elements; and means for transmitting microinstructions generated by said read only storage elements to main storage, data flow and input/output control elements.

6. A microprogram control sybsystem, for an information handling system, said subsystem comprising:

a first read only storage element for generating microinstructions in response to break-in request sequences, interrupt request sequences, and instruction fetch sequences;

a plurality of second read only storage elements each for generating microinstructions in response to an address field of an instruction to be executed by said information handling system;

a third read only storage element for generating microinstructions to control the execution of said instruction in response to an operation code field of said instruction and signals occurring in data flow during execution of said instruction; and a sequence generator for controlling the enabling of said first, second and third read only storage elements in sequence during instruction and execution cycles of said information handling system.

* * * * *